(12) United States Patent
Voruganti et al.

(10) Patent No.: US 9,622,135 B1
(45) Date of Patent: Apr. 11, 2017

(54) TRAFFIC REDIRECTION CONTROL IN WIRELESS NETWORKS

(71) Applicant: Sprint Communications Company L.P., Overland Park, KS (US)

(72) Inventors: Bhanu Prakash Voruganti, Overland Park, KS (US); John Gatewood, Lee's Summit, MO (US); Sharon L. Woodrum, Louisburg, KS (US); Matthew P. Hund, Olathe, KS (US); George Jason Schnellbacher, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 127 days.

(21) Appl. No.: 14/508,702

(22) Filed: Oct. 7, 2014

(51) Int. Cl.
*H04L 12/46* (2006.01)
*H04L 12/28* (2006.01)
*H04W 36/14* (2009.01)
*H04W 88/06* (2009.01)
*H04W 36/24* (2009.01)

(52) U.S. Cl.
CPC ......... *H04W 36/24* (2013.01); *H04L 12/2856* (2013.01); *H04L 12/4633* (2013.01); *H04W 36/14* (2013.01); *H04W 88/06* (2013.01)

(58) Field of Classification Search
CPC ..... H04W 88/06; H04W 48/18; H04W 36/14; H04L 61/6077; H04L 63/0428; H04L 12/4633; H04L 12/2856
See application file for complete search history.

(56) References Cited

U.S. PATENT DOCUMENTS

| 8,103,278 | B2 * | 1/2012 | Tsao | 455/442 |
| 8,494,484 | B2 * | 7/2013 | Kozu | 455/410 |
| 8,527,001 | B2 * | 9/2013 | Ekici | H04W 48/18 455/343.5 |
| 8,756,339 | B2 | 6/2014 | Harp | |
| 8,819,199 | B2 * | 8/2014 | Matuszewski | H04L 45/02 709/218 |
| 2014/0013401 | A1 | 1/2014 | Schnellbacher et al. | |

* cited by examiner

*Primary Examiner* — Ayaz Sheikh
*Assistant Examiner* — Debebe Asefa

(57) ABSTRACT

Systems, methods, apparatuses, and software for providing redirection control of communications over a wide area network for user devices over a wireless local area network are provided herein. In one example, a method of operating a wireless network device is provided. The method includes receiving a connection request from a user device over the wireless local area network, and responsive to the connection request, identifying a traffic plan for the user device based at least on one or more policy factors associated with the user device. When the traffic plan indicates redirected access, then the method includes establishing a tunnel to a cellular communication network associated with the user device and routing the communications of the user device over the tunnel. When the traffic plan indicates local access, then the method includes routing the communications of the user device to the wide area network.

20 Claims, 5 Drawing Sheets

TRAFFIC REDIRECTION CONTROL IN WIRELESS NETWORKS

TECHNICAL FIELD

Aspects of this disclosure are related to the field of digital communications, and in particular to wireless networking systems and network devices.

BACKGROUND

Wireless communication systems can include user devices, such as cellular communication devices, that can receive wireless access to communication services from various access nodes of a cellular communication network distributed over a geographic area. These user devices can also include wireless network transceivers for communicating over wireless local area networks (LANs), such as IEEE 802.11 compatible wireless LANs. The user devices can include various other transceivers and interfaces for communicating over different wired and wireless links.

Wireless networking devices, such as a wireless router devices, can provide wireless LANs to various user devices over a small area, such as a home or business location. The wireless networking devices can also provide access to other packet networks and wide area networks (WANs), such as the Internet, for the user devices that receive access over the wireless LAN. When user devices include transceivers for both wireless LANs and cellular communication networks, these user devices can selectively receive network access over either wireless LANs or cellular networks depending upon proximity to access nodes, signal quality, or other factors. When user devices receive network access over the wireless LAN to a WAN or the Internet, wireless networking devices typically route traffic and communications of the user devices to the WAN or Internet.

Overview

Systems, methods, apparatuses, and software for providing redirection control of communications over a wide area network for user devices over a wireless local area network are provided herein. In one example, a method of operating a wireless network device is provided. The method includes receiving a connection request from a user device over the wireless local area network, and responsive to the connection request, identifying a traffic plan for the user device based at least on one or more policy factors associated with the user device. When the traffic plan indicates redirected access, then the method includes establishing a tunnel to a cellular communication network associated with the user device and routing the communications of the user device over the tunnel. When the traffic plan indicates local access, then the method includes routing the communications of the user device to the wide area network. In another example, a wireless network device is provided. The wireless network device includes a network interface configured to receive a connection request from a user device over the wireless local area network. The wireless network device also includes a processing system configured to process the connection request to identify at least one policy factor for the user device, and identify a traffic plan for the user device based at least on the at least one policy factor. When the traffic plan indicates redirected access, then the network interface is configured to establish a tunnel to a cellular communication network associated with the user device and route the communications of the user device over the tunnel. When the traffic plan indicates local access, then the network interface is configured to route the communications of the user device to the wide area network.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
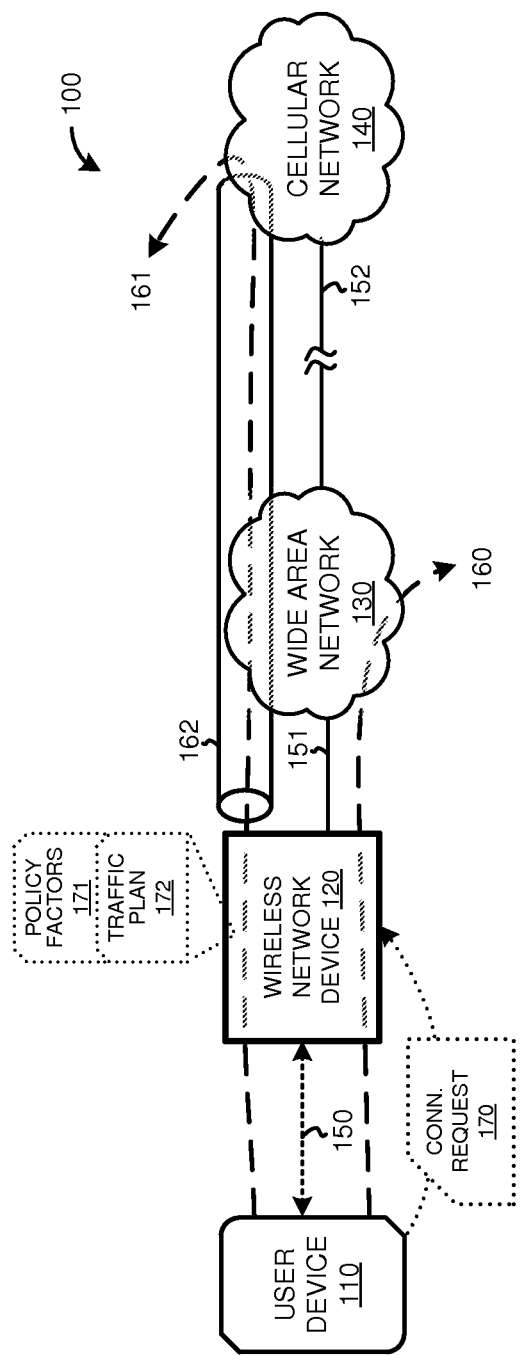
FIG. 1 is a system diagram illustrating a communication system.

FIG. 1 is a system diagram illustrating communication system 100. System 100 includes user device 110, wireless network device 120, wide area network (WAN) 130, and cellular communication network 140. User device 110 receives wireless local area network (LAN) access over wireless LAN 150 from wireless network device 120. Wireless network device 120 and wide area network 130 communicate over packet link 151. Wide area network 130 and cellular network 140 communicate over packet link 152.

In operation, user device 110 can receive wireless access to network services from wireless network device 120. As a part of these services, wireless network device 120 can route traffic of WLAN 150 over further networks, such as WAN 130 or the Internet. Additionally, cellular communication network 140 can also communicate over WAN 130 or the Internet with other networks and network systems.

Figure 2:
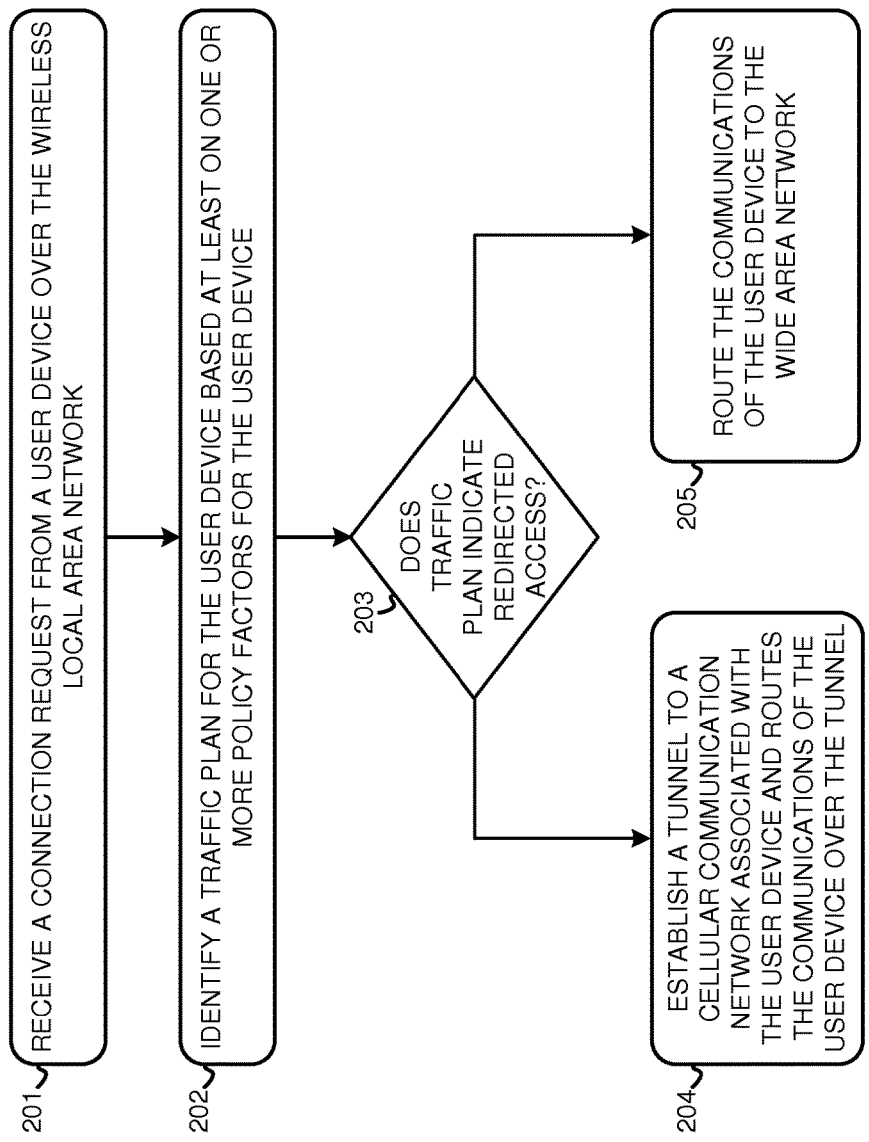
FIG. 2 is a flow diagram illustrating a method of operation of a wireless network device.

FIG. 2 is presented to further illustrate the operation of the elements of FIG. 1. FIG. 2 is a flow diagram illustrating a method of operation of wireless network device 120. The operations of FIG. 2 are referenced below parenthetically. In FIG. 2, wireless network device 120 receives (201) a connection request from user device 110 over wireless local area network 150. Connection request 170 can include a request from user device 110 to receive access to local area network 150, or to receive access to wide area network 130 through wireless network device 120, among other connection requests.

Responsive to connection request 170, wireless network device 120 identifies (202) traffic plan 172 for user device 110 based at least on the one or more policy factors 171 for user device 110. The one or more policy factors can comprise various properties associated with user device 110, such as a Network Access Identifier (NAI) associated with user device 110, where the NAI is associated with identifying user device 110 to cellular communication network 140. Other policy factors can be considered, such as an application or type of communications being employed by user device 110. These applications and types of communications can include Voice over Internet Protocol (VoIP) applications and communications. Other policy factors can be based on present conditions associated with user device 110, such as a signal strength for communications over wireless LAN 150 for user device 110, a time of day of the connection request, or resource identifiers requested by user device 110.

The one or more policy factors 171 can be processed by wireless network device 120 to identify traffic plan 172. Traffic plan 172 can be identified from among several traffic plans, but in this example, traffic plan 172 includes two different traffic plan arrangements. A first traffic plan indicates redirected access for user device 110, while a second traffic plan indicates local non-redirected access for user device 110.

When the traffic plan indicates redirected access (203), then wireless network device 120 establishes (204) a tunnel to a cellular communication network associated with user device 110 and routes the communications of the user device over the tunnel. In this example, tunnel 162 is established between wireless network device 120 and cellular communication network 140, over at least wide area network 130. Tunnel 162 is a network tunnel for carrying packet traffic associated with user device 110, which can comprise a Generic Routing Encapsulation (GRE) tunnel, Layer 2 Tunneling Protocol (L2TP) tunnel, Hypertext Transfer Protocol (HTTP) tunnel, or virtual private network (VPN) tunnel, among others. Encryption may be employed over tunnel 162.

Pathway 161 of FIG. 1 illustrates a redirected traffic plan for user device 110. Once traffic of user device 110 has been redirected to cellular communication network 140, then cellular communication network 140 can route this traffic to other networks, which can include over WAN 130 or the Internet, among other networks.

When the traffic plan does not indicate redirected access (203), then wireless network device 120 routes (205) the communications of user device 110 to wide area network 130. In non-redirected traffic plans, traffic associated with user device 110 is not redirected to cellular communication network 140, and instead is routed directly by wireless network device 120 to wide area network 130. Pathway 160 of FIG. 1 illustrates a non-redirected, or local, traffic plan for user device 110.

Figure 3:
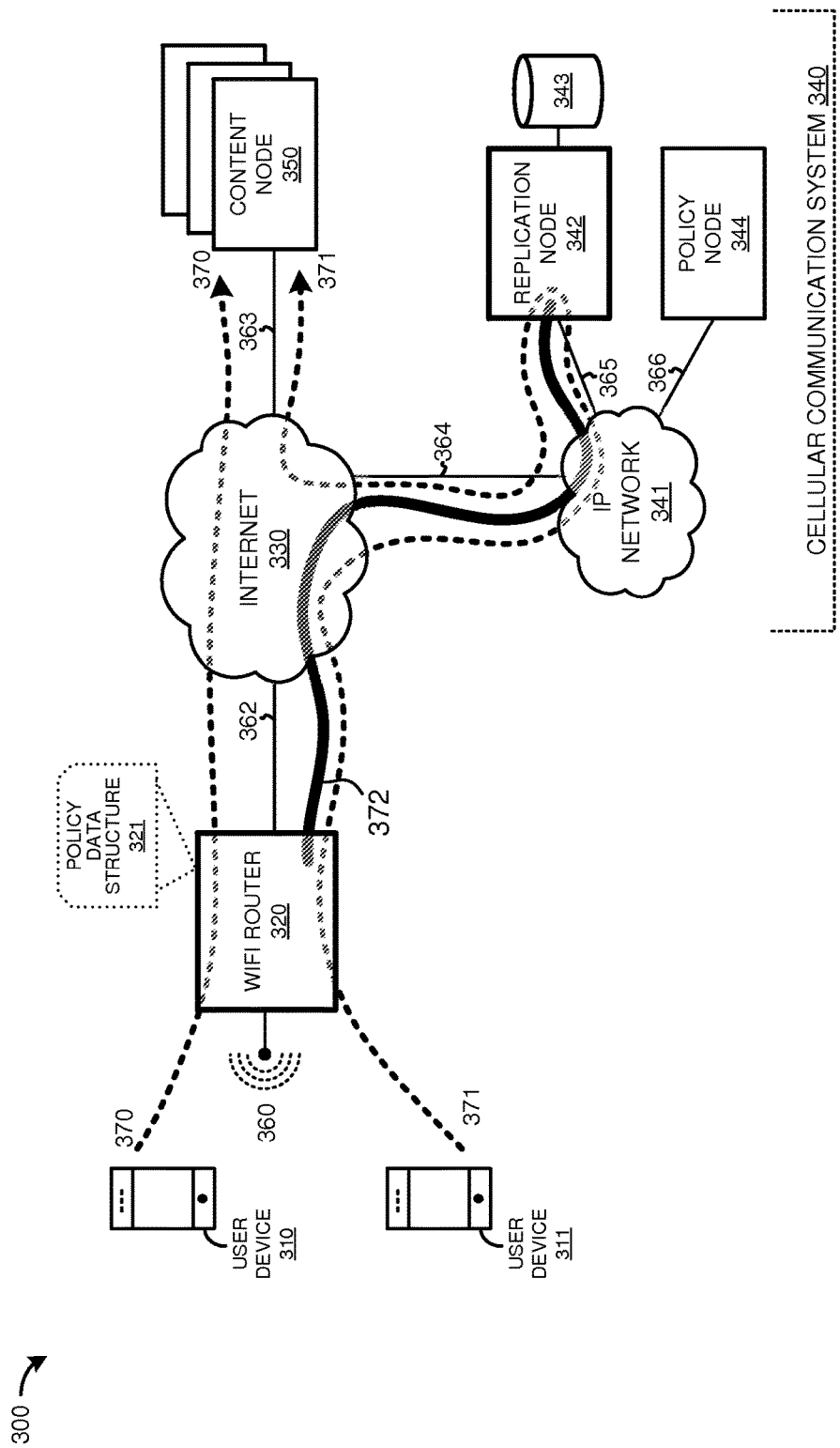
FIG. 3 is a system diagram illustrating a communication system.
Figure 4:
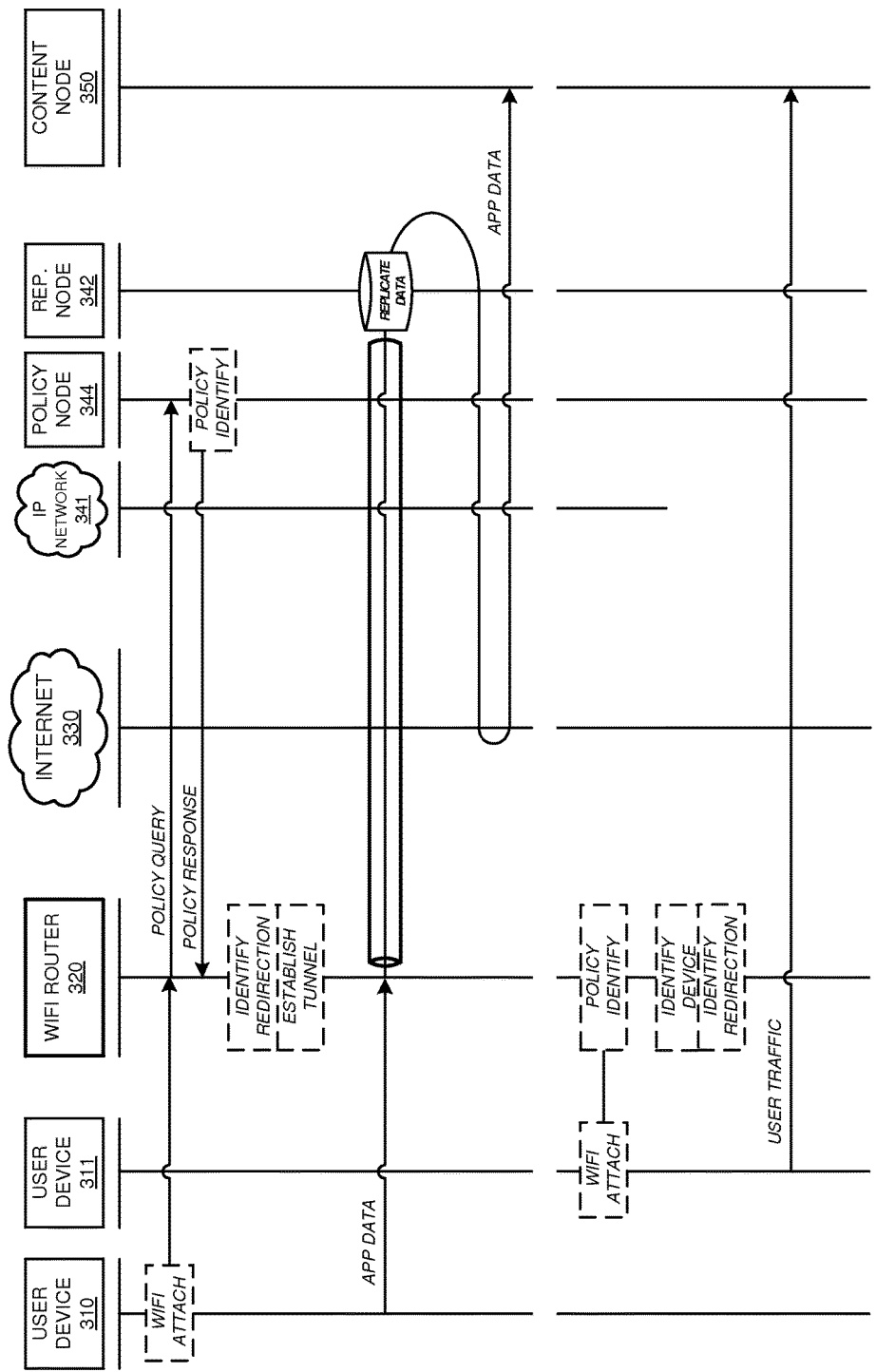
FIG. 4 is a sequence diagram illustrating a method of operation of a communication system.

In further examples, tunnel 162 is established between a redirection node in cellular communication network 140. This redirection node can the further direct the communications of user device 110 that are transferred over tunnel 162 to other destinations, which can include over wide area network 130 or other networks. In yet further examples, tunnel 162 is established between a replication node in cellular communication network 140. This replication node can store portions of the communications transferred by user device 110 over tunnel 162. Further examples of redirection nodes and replication nodes are shown in FIGS. 3 and 4 below.

Referring back to the elements of FIG. 1, user device 110 comprises transceiver circuitry, processing circuitry, and user interface elements. The transceiver circuitry typically includes amplifiers, filters, modulators, and signal processing circuitry. User device 110 can also include user interface systems, network interface card equipment, memory devices, non-transitory computer-readable storage mediums, software, processing circuitry, or some other communication components. User device 110 can be a wireless communication device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof. In this example, user device 110 includes multiple transceiver portions or antenna portions, among other circuit and equipment elements, for communicating wirelessly with multiple wireless communication networks, using different wireless communication modes or wireless communication protocols.

Wireless network device 120 comprises RF communication and control circuitry, antenna elements, and communication routing equipment and systems for providing a wireless local area network, such as WLAN 150. The RF communication circuitry typically includes amplifiers, filters, RF modulators, transceivers, and signal processing circuitry. In many examples, wireless network device 120 includes circuitry and equipment to provide a wireless local area network to user devices for routing user communications between wide area network 130 and user devices, among other operations. Wireless network device 120 may also comprise a wireless hotspot, wireless access point, wireless router, IEEE 802.11 wireless router, IEEE 802.11 wireless access point, IEEE 802.15 hub, data buffers, data modems, packet routers, servers, memory devices, software, processing systems, cabling, network communication interfaces, physical structural supports, user interfaces, or other communication apparatuses. Wireless network device 120 may also include processing systems, computer-readable media, data structures, application programs, firmware, or some other form of computer-readable processing instructions. The computer-readable media may include a disk, tape, integrated circuit, server, or some other memory device, and also may be distributed among multiple memory devices.

Wide area network 130 includes equipment and systems to route packet communications between endpoints using packet-based communication protocols, including Internet protocol (IP) and Ethernet. Wide area network 130 can comprise routers, switches, gateways, bridges, as well as various network links. Although wide area network 130 is shown in FIG. 1, it should be understood that other networks could be included, such as the Internet, local area networks, wide area networks, metropolitan area networks, among other networks and systems.

Cellular communication network 140 comprises communication and control systems for providing access to communication services for user devices. Cellular communication network 140 can provide communication services including voice calls, text messages, data access, or other communication services provided over a cellular communication network. In some examples, cellular communication network 140 includes equipment to provide wireless access to communication services within different coverage areas to user devices, route communications between content providers and user devices, and facilitate handoffs between equipment of different coverage areas, among other operations. Cellular communication network 140 may also comprise base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, preferred routing list (PRL) systems, or other communication and control equipment.

Wireless local area network (WLAN) 150 uses the air or space as the transport media. WLAN 150 comprises a wireless local area network communication link, and may use various protocols, such as IEEE 802.11, IEEE 802.15, wireless fidelity (Wi-Fi), Bluetooth, Zigbee, or some other wireless LAN or wireless personal area network (PAN), including combinations, improvements, or variations thereof.

Communication links 151 and 152 each uses metal, glass, optical, air, space, or some other material as the transport media. Communication links 151 and 152 each can use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 151 and 152 each can be a direct link or may include intermediate networks, systems, or devices, and can include a logical network link transported over multiple physical links. In some examples, link 151 or link 152 each comprises a cellular wireless link that uses the air or space as the transport media. A cellular communication link can employ various protocols, such as Code Division Multiple Access (CDMA), Evolution-Data Optimized (EVDO), single-carrier radio transmission technology link (1×RTT), Worldwide Interoperability for Microwave Access (Wi-MAX), Global System for Mobile Communication (GSM), Universal Mobile Telecommunications System (UMTS), Long Term Evolution (LTE), High Speed Packet Access (HSPA), Radio Link Protocol (RLP), or some other cellular or wireless communication format, including combinations, improvements, or variations thereof.

Although one main wireless link for link 150 is shown in FIG. 1, it should be understood that wireless link 150 is merely illustrative to show communication modes or wireless access pathways for user device 110. In other examples, further wireless links can be shown, with portions of the further wireless links shared and used for different communication sessions or different content types, among other configurations.

Communication links 150-152 may each include many different signals sharing the same associated link, as represented by the associated lines in FIG. 1, comprising resource blocks, access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

As a further example of redirected traffic handling for user devices by a wireless network device, FIG. 3 is presented. FIG. 3 is a system diagram illustrating communication system 300. Communication system 300 includes user devices 310-311, Wireless Fidelity (WIFI) router 320, Internet 330, cellular communication system 340, and one or more content nodes 350. Cellular communication system 340 includes Internet Protocol (IP) network 341, replication node 342, storage system 343, and policy node 344. User devices 310-311 and WIFI router 320 communicate over wireless local area network (WLAN) 360. WIFI router 320 and Internet 330 communicate over link 362 which is an IP packet link in this example. Internet 330 and content node 350 communicate over IP packet link 363. Internet 330 and IP network 341 communicate over IP packet link 364. Replication node 342 and IP network 341 communicate over packet link 365. Policy node 344 and IP network 341 communicate over packet link 366. Replication node 342 and storage system 343 communicate over a storage link in this example.

In operations, user device 310-311 receive access to WLAN 360 from WIFI router 320, which provides a wireless network for local access by user devices 310-311. WIFI router 320 also routes traffic of WLAN 360 over Internet 330. WIFI router 320 can be an example of wireless network device 120 in FIG. 1, although variations are possible. WIFI router 320 can provide other network and communication services, such as network address translation, firewall services, network address assignment and management, traffic routing, traffic management, and user device policy identification and enforcement, among other services, including combinations thereof.

Each of user devices 310-311 can have various policies for traffic routing established by WIFI router 320. These policies can be based on a user identity, a device identity, properties of the users or devices, or properties of the communications traffic associated with any user device, including combinations thereof. In some examples, such as shown in FIG. 3, this policy information can be stored in WIFI router 320 in policy data structure 321. In other examples, policy data structure 321 is omitted, or can be supplemented by other data structures associated with policy node 344. These various policies are referenced by WIFI 320 to determine a traffic routing arrangement for the associated user devices. The traffic routing arrangements can include routing traffic to a local Internet connection or can include redirecting traffic to other nodes, such as replication node 342, among other traffic arrangements.

User devices 310-311 typically seek access to various content or server nodes over Internet 330, such as content node 350. However, WIFI 320 can alter routing of communications associated with this access based on the various policies established for the user devices. This altered routing can be used to redirect and replicate data and communications transferred by any of user devices 310-311. In many examples, the traffic redirection or replication is performed by WIFI router 330 without knowledge of the redirection or replication by user devices 310-311. To further illustrate policy-based traffic redirection and replication, FIG. 4 is presented.

FIG. 4 is a sequence diagram illustrating a method of operation of communication system 300. In FIG. 4, user device 310 desires to receive access to Internet 330 via WIFI router 320. To receive this access, user device 310 attaches to WIFI router 320, such as by joining a wireless local area network provided by WIFI router 320. In this example, the local area network includes WLAN 360, which can comprise an IEEE 802.11 type of wireless network, among others. Other devices can be connected via WLAN 360, such as user device 311 or other user devices.

During the attachment process, WIFI router 320 identifies various policy factors associated with user device 310 or with the access provided to user device 310. The various policy factors can include an identity of user device 310, such as a network access identifier (NAI), user identity, phone number, network address, IP address, or other identity information. The various policy factors can include an application running on user device 310 seeking access to Internet 330 or WLAN 360, such as a VoIP application, photo application, or other data application which transfers data over WLAN 360 or Internet 330. When the application includes a browser application, such as a web browser, or other application which requests network content, these various properties can include a network address of the content, such as a Uniform Resource Identifier (URI), Uniform Resource Locator (URL), IP address, or other network identifier or address. In further examples, the various policy factors can include current status information associate with user device 310, such as a signal strength user device 310 is receiving from WIFI router 320, a bandwidth of network service available to user device 310 over WLAN 360, a time of day of the network access over WLAN 360, among other policy factors.

The various policy factors can be employed to identify and select a routing policy for user device 310. This routing policy can be selected by WIFI router 320, such as when router 320 includes data structures for storing policy information for user devices. FIG. 3 illustrates an example data structure 321. In this example, however, WIFI router 320 transfers a policy query for delivery to policy node 344. The policy query can include one or more of the various properties mentioned above, and can be used by policy node 344 to select a routing policy for user device 310. Once a routing policy is identified for user device 310 by policy node 344, this routing policy is transferred for delivery to WIFI router 320. It should be understood that WIFI router 320 itself or in combination with policy node 344 can instead process the various properties mentioned above to select a policy and traffic plan for user device 310.

The routing policy indicates at least a routing preference for traffic of user device 310. The routing policy can indicate to redirect traffic for user device 310. The routing policy for user device 310 can be specified by traffic type, or for a particular application or application type executed on user device 310. For example, a first routing policy can be specified for voice call traffic or voice over packet (such as VoIP) traffic, while a different routing policy can be specified for other network traffic, such as web pages or certain specific web pages. The routing policy can instead indicate that no redirection is desired for user device 310. In addition to redirection of traffic of user device 310, replication of traffic can also be specified in the routing policy identified for user device 310. This replication can be handled by a replication node, such as replication node 342. Replication will be discussed below.

Once a routing policy has been received by WIFI router 320, then WIFI router can identify a redirection plan or traffic plan for user device 310 based on the present policy factors for user device 310. Redirection can include redirecting traffic of user device 310 or of a particular application or type of traffic transferred by user device 310. The redirection of traffic in this example includes redirecting traffic to replication node 342 in cellular communication system 340. Replication node 342 includes storage elements, such as storage 343 for replicating traffic or a portion of traffic that is transferred by user device 310. This replication can comprise storage of data transferred by user device 310 in addition to forwarding the traffic for delivery to the destination originally indicated by user device 310.

For example, traffic of user device 310 can include data, such as packets, intended for delivery to content node 350. This data can include user data, application data, voice data, multimedia data, textual data, or any other data transferred by user device 310. In a further example, content node 350 can comprise a photo sharing site, such as a social media website, and the traffic of user device 310 can include photos and other associated data. Replication node 342 can intercept this traffic and replicate any data transferred by user device 310 en route to content node 350. Replication node can allow the traffic to proceed to content node 350 after replication or concurrent with replication of the data.

To redirect the traffic to replication node 342, WIFI router 320 can establish tunnel 372 with replication node 342. Tunnel 372 can include any tunnel for routing traffic, such as data packets, encapsulated to form a tunnel between WIFI router 320 and replication node 342. Although various tunneling formats can be employed, some examples include Generic Routing Encapsulation (GRE) tunneling, L2TP tunneling, IP tunneling, Internet Protocol Security (IPsec) tunneling, secure shell (SSH) tunneling, or Internet Control Message Protocol (ICMP) tunneling, including variations and combinations thereof. In examples where a tunnel is employed, an encrypted IP protocol or process can be employed to transfer the traffic over the tunnel.

In many examples, user device 310 is not made aware of the traffic redirection, and communicates with a desired destination, such as content node 350, as would occur in a non-redirected example. The redirection can include redirecting traffic of user device 310 to replication node 342 and then further redirecting the traffic of user device 310 back to WIFI router 320 for subsequent routing of the traffic over Internet 330 by WIFI router 320. Tunnel 372 can be employed for this redirection.

Only a portion of the traffic originated by user device 310 might be replicated or redirected by WIFI router 320 or replication node 342. This portion of the traffic might be determined based on an application type originating the traffic on user device 310, upon a type of traffic or content of packets employed, or might instead be dependent upon a time or day the traffic is transferred. Other variations are possible.

Redirection or replication of traffic of user device 310 can be halted responsive to disconnection of user device 310 from WIFI router 320 and WLAN 360, or responsive to other events, such as a particular time or day, or upon detecting a particular type of traffic, among other considerations.

In another example of system 300, FIG. 4 illustrates example operation of user device 311 and WIFI router 320. In this example, user device 311 attaches to WIFI router 320 to receive access to WLAN 360 and Internet 330. Responsive to user device 311 attaching to WIFI router 320, WIFI router 320 then identifies a routing policy for user device 311. However, instead of checking with policy node 344 in this example, WIFI router 320 references data structure 321 to identify a routing policy. As with user device 310, this routing policy can be determined based on various factors, which can include a traffic type, a user identity, a device identity, an application type, a time, a day, or other factors, including combinations thereof. As shown in FIG. 4, WIFI router 320 identifies the policy based on a device identifier of user device 311, such as a NAI or other identifier.

Once the policy has been identified, then a traffic redirection plan can be implemented by WIFI router 320. In this example, no redirection is needed for user device 311, such as when user device 311 has an NAI that does not indicate traffic redirection or traffic replication. In this example, traffic of user device 311 is transferred to Internet 330 without redirection over a tunnel to replication node 342. Thus, traffic of user device 311 can be transferred for delivery to content node 350 or other destinations without redirection. In examples where traffic of user device 311 are routed without redirection, then a simple IP protocol or process can be used to route traffic of user device 311 over Internet 330.

In other examples, the policy factors include parental controls or corporate policy preferences. The parental controls can include when a parent desires to redirect traffic of a particular device, such as that operated by a child, to a replication node or redirection node for parental monitoring of that device. In corporate policy examples, a company can desire to redirect all photo transfers or data transfers originated at a user device to a company monitoring node, such as replication node 342, to monitor for corporate espionage or sensitive information dissemination. A command from a parental device or from a corporate administration node can be issued for delivery to WIFI router 320 which responsively enacts traffic redirection or replication accordingly.

In further examples, replication node 342 comprises a lawful intercept node. This node can be used to comply with Communications Assistance for Law Enforcement Act (CALEA) requirements, among other requirements. For example, when a VoIP call is placed by any of user device 310 or 311, then a tunnel can established with replication node 342 for recording or storage of the VoIP call in storage 343. In yet further examples, the policy factors can include a law enforcement command to intercept a VoIP call or data session of a user device at a particular WIFI router, such as WIFI router 320. This law enforcement command can instruct WIFI router 320 to redirect traffic to redirection node 342, and this command can be specific to a particular identity or person, among other factors as described above.

Figure 5:
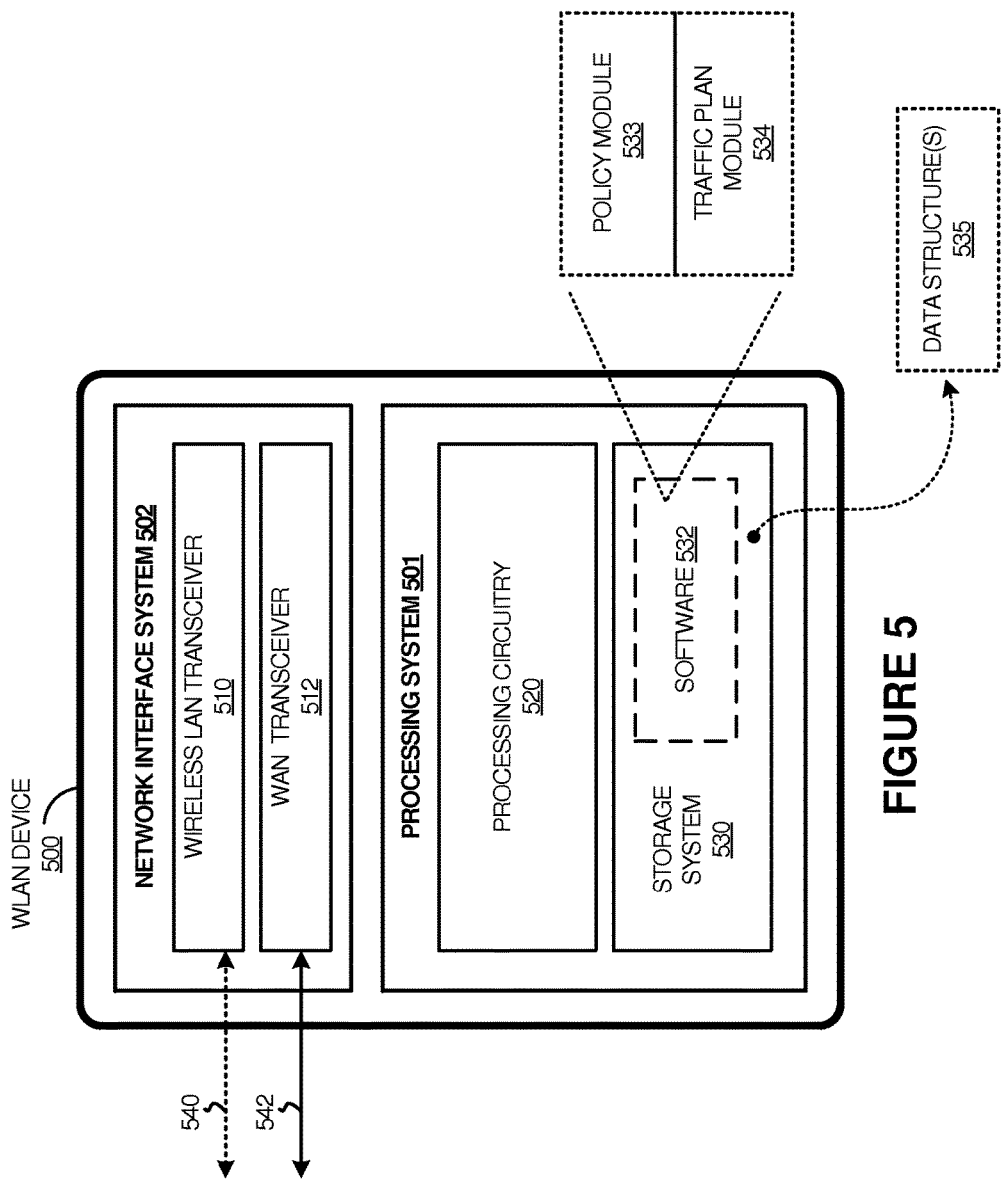
FIG. 5 is a block diagram illustrating a wireless network device.

FIG. 5 is a block diagram illustrating a detailed view of WLAN device 500. WLAN device 500 can include equipment and systems as discussed herein for wireless network device 120 in FIG. 1 and WIFI router 320 in FIG. 3, although variations are possible. WLAN device 500 includes processing system 501 and network interface system 502. Processing system 501 further includes processing circuitry 520 and storage system 530. Network interface system 502 further includes wireless LAN transceiver 510 and WAN transceiver 512. In operation, processing circuitry 520 is operatively linked to wireless LAN transceiver 510, WAN transceiver 512, and storage system 530 by one or more communication interfaces, which can comprise a bus, discrete connections, network links, software interfaces, or other circuitry. WLAN device 500 can be distributed or consolidated among equipment or circuitry that together forms the elements of WLAN device 500. WLAN device 500 can optionally include additional devices, features, or functionality not discussed here for purposes of brevity.

Networks interface system 502 includes one or more network interfaces. In WLAN device 500, network interface system 502 includes wireless LAN transceiver 510 and WAN transceiver 512. Wireless LAN transceiver 510 includes at least one wireless communication interfaces for communicating over wireless local area networks, such as described for wireless LAN 150. Wireless LAN transceiver 510 includes antennas, power amplifiers, RF circuitry, transceivers, network interface card equipment, modems, and other communication circuitry. In this example, wireless LAN transceiver 510 communicates over link 540. Link 540 can include one or more wireless local area network links as described herein, such as that described for link 150 in FIG. 1 and link 360 in FIG. 3.

WAN transceiver 512 includes one or more network interfaces or communication transceivers for communicating over communication networks, such as link 151 of FIG. 1. The network interfaces can include an Ethernet interfaces, IP interfaces, T1 interfaces, or other wide area network communication interfaces which can communicate over a packet link. Examples of communication WAN transceiver 512 include network interface card equipment, transceivers, routers, bridges, receivers, transmitters, modems, and other communication circuitry. In this example, WAN transceiver 512 communicates over link 542. Link 542 can include one or more communication links as described herein, such as that described for link 151 in FIG. 1 and link 362 in FIG. 3.

Processing circuitry 520 can comprise one or more microprocessors and other processing circuitry that retrieves and executes software 532 from storage system 530. Processing circuitry 520 can be implemented within a single processing device but can also be distributed across multiple processing devices or sub-systems that cooperate in executing program instructions. Examples of processing circuitry 520 include general purpose central processing units, application specific processors, and logic devices, as well as any other type of processing device, combinations, or variations thereof. In some examples, portions of processing circuitry 520 is physically separate from some elements of WLAN device 500 and area included in remote servers, cloud-based processing systems, or virtualized computing systems.

Storage system 530 can comprise any non-transitory computer readable storage media capable of storing software 532 that is executable by processing circuitry 520. Storage system 530 also includes data structures 535 which include one or more databases, tables, lists, or other data structures that relate policy factors to routing policies for user devices. Storage system 530 can include volatile and nonvolatile, removable and non-removable media implemented in any method or technology for storage of information, such as computer readable instructions, data structures, program modules, or other data. Storage system 530 can be implemented as a single storage device but can also be implemented across multiple storage devices or sub-systems co-located or distributed relative to each other. Storage system 530 can comprise additional elements, such as a controller, capable of communicating with processing circuitry 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 532 can be implemented in program instructions and among other functions can, when executed by WLAN device 500 in general or processing circuitry 520 in particular, direct WLAN device 500, processing system 501, or processing circuitry 520 to provide redirection control of communications over a wide area network for user devices over a wireless local area network, receive a connection requests from user devices over the wireless local area network, identify traffic plans for the user devices based at least on one or more policy factors associated with the user devices, establish tunnels to cellular communication networks associated with the user devices, route the communications of the user device over the tunnels, and route the communications of the user devices to the wide area network, among other operations. Software 532 can include additional processes, programs, or components, such as operating system software, database software, or application software. Software 532 can also comprise firmware or some other form of machine-readable processing instructions executable by elements of processing system 501, such as processing circuitry 520.

In at least one implementation, the program instructions can include policy module 533 and traffic plan module 534.

Policy module 533 identifies policy factors for user devices that connect to WLAN device 500 over wireless LAN 540. These policy factors are discussed herein, but can include identities of user devices, NAIs, phone numbers, network addresses, applications run by user devices, traffic types of user devices, times of day, days of the week, external policy commands, such as from law enforcement, corporate, or parental entities, or other policy factors, including combinations and variations thereof. Based on the policy factors and on relationships stored in data structures 535, traffic plan module 534 can identify a routing plan for user devices. These routing plans include redirected routing to cellular communication networks or redirection nodes in cellular communication networks. The redirected routing can also include replication of traffic of user devices in one or more replication nodes. The routing plans can also include simple routing of user device traffic over WAN link 542, as well as tunneled connections to other nodes over WAN link 542.

In general, software 532 can, when loaded into processing circuitry 520 and executed, transform processing circuitry 520 overall from a general-purpose computing system into a special-purpose computing system customized to provide redirection control of communications over a wide area network for user devices over a wireless local area network, receive a connection requests from user devices over the wireless local area network, identify traffic plans for the user devices based at least on one or more policy factors associated with the user devices, establish tunnels to cellular communication networks associated with the user devices, route the communications of the user device over the tunnels, and route the communications of the user devices to the wide area network, among other operations. Encoding software 532 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless network device that provides access to a wide area network for user devices over a wireless local area network, the method comprising:

receiving a connection request from a user device over the wireless local area network;

responsive to the connection request, inspecting packet data for the user device and identifying a traffic plan for the user device based at least on one or more policy factors associated with the packet data for the user device;

when the traffic plan indicates redirected access, then encapsulating the packet data to form a tunnel over the wide area network to a cellular communication network associated with the user device and routing communications of the user device over the tunnel; and when the traffic plan indicates local access, then routing the communications of the user device to the wide area network.

2. The method of claim 1, further comprising:

when the traffic plan indicates the redirected access, then redirecting the communications for the user device over the tunnel for replication by a replication node in the cellular communication network.

3. The method of claim 2, further comprising:

encapsulating the packet data to form the tunnel with the replication node to establish the tunnel to the cellular communication network.

4. The method of claim 1, wherein the at least one policy factor comprises a network access identifier of the user device that identifies the user device for access to the cellular communication network.

5. The method of claim 1, wherein the one or more policy factors comprise at least one of a Uniform Resource Identifier requested by the user device for the communications, an application type employed for the communications by the user device, and a type of the communications.

6. The method of claim 1, wherein the wide area network comprises an Internet connection; and further comprising:

when the traffic plan indicates the redirected access, then encapsulating the packet data to form an encrypted Internet Protocol link to the cellular communication network for replication of the communications in the cellular communication network; and when the traffic plan indicates the local access, then routing the communications of the user device over the Internet connection using a simple Internet Protocol connection.

7. The method of claim 1, wherein the one or more policy factors comprises an identity of the user device; and further comprising:

inspecting packet data for the user device to identify when the packet data comprise Voice over Internet Protocol packet data; and when the packet data comprises Voice over Internet Protocol packet data and the traffic plan indicates traffic redirection, then encapsulating the Voice over Internet Protocol packet data to form the tunnel to the cellular communication network associated with the user device and routing Voice over Internet Protocol communications of the user device over the tunnel.

8. The method of claim 1, wherein identifying the traffic plan for the user device based at least on the one or more policy factors associated with the packet data for the user device comprises transferring at least one of the one or more policy factors for delivery to a policy node of the cellular communication network responsive to the connection request and responsively receiving the traffic plan transferred from the policy node.

9. The method of claim 1, wherein identifying the traffic plan for the user device based at least on the one or more policy factors associated with the packet data for the user device comprises processing a data structure comprising various policy factors in the wireless network device for the user device against a present policy factor of the user device to identify the traffic plan as associated with the present policy factor.

10. The method of claim 1, wherein the wireless network device comprises a network router device configured to route communications of the wireless local area network over the wide area network.

11. A wireless network device that provides access to a wide area network for user devices over a wireless local area network, the wireless network device comprising:
   a network interface system configured to provide the wireless local area network and receive a connection request from a user device over the wireless local area network;
   a processing system configured to process the connection request to inspect packet data for the user device, identify at least one policy factor associated with the packet data for the user device, and identify a traffic plan for the user device based at least on the at least one policy factor;
   when the traffic plan indicates redirected access, then the processing system configured to encapsulate the packet data to form a tunnel over the wide area network to a cellular communication network associated with the user device and route communications of the user device over the tunnel; and
   when the traffic plan indicates local access, then the processing system configured to route the communications of the user device to the wide area network.

12. The wireless network device of claim 11, comprising:
   when the traffic plan indicates the redirected access, then the processing system configured to redirect the communications for the user device over the tunnel for replication by a replication node in the cellular communication network.

13. The wireless network device of claim 12, comprising:
   the processing system configured to encapsulate the packet data to form the tunnel with the replication node to establish the tunnel to the cellular communication network.

14. The wireless network device of claim 11, wherein the at least one policy factor comprises a network access identifier of the user device that identifies the user device for access to the cellular communication network.

15. The wireless network device of claim 11, wherein the at least one policy factor comprises at least one of a Uniform Resource Identifier requested by the user device for the communications, an application type employed for the communications by the user device, and a type of the communications.

16. The wireless network device of claim 11, wherein the wide area network comprises an Internet connection; and comprising:
   when the traffic plan indicates the redirected access, then the processing system configured to encapsulate the packet data to form an encrypted Internet Protocol link to the cellular communication network for replication of the communications in the cellular communication network; and
   when the traffic plan indicates the local access, then the processing system configured to route the communications of the user device over the Internet connection using a simple Internet Protocol connection.

17. The wireless network device of claim 11, wherein the at least one policy factor comprises an identity of the user device; and comprising:
   the processing system configured to inspect packet data for the user device to identify when the packet data comprise Voice over Internet Protocol packet data; and
   when the packet data comprises Voice over Internet Protocol packet data and the traffic plan indicates traffic redirection, then the processing system configured to encapsulate the Voice over Internet Protocol packet data to form the tunnel to the cellular communication network associated with the user device and route Voice over Internet Protocol communications of the user device over the tunnel.

18. The wireless network device of claim 11, comprising:
   the processing system configured to transfer the at least one policy factor for delivery to a policy node of the cellular communication network responsive to the connection request and responsively receive the traffic plan transferred from the policy node.

19. The wireless network device of claim 11, comprising:
   the processing system configured to process a data structure comprising various policy factors associated with packet data for the user device against a present policy factor of the user device to identify the traffic plan as associated with the present policy factor.

20. The wireless network device of claim 11, wherein the wireless network device comprises a network router device with the network interface system configured to route communications of the wireless local area network over the wide area network.

* * * * *